(12) United States Patent
Polo et al.

(10) Patent No.: US 8,696,246 B2
(45) Date of Patent: Apr. 15, 2014

(54) SUPPORTING ELEMENT FOR AN OFFSHORE WIND TURBINE, PRODUCTION METHOD THEREOF AND METHOD FOR INSTALLING SAME

(75) Inventors: Miguel Nunez Polo, Sarriguren (ES); Raul Manzanas Ochagavía, Pamplona (ES); Federico Sancho Castiello, Las Rozas de Madrid (ES)

(73) Assignees: Acciona Windpower, S.A., Sarriguren (Navarra) (ES); Acciona Energia, S.A., Sarriguren (Navarra) (ES)

( * ) Notice: Subject to any disclaimer, the term of this patent is extended or adjusted under 35 U.S.C. 154(b) by 399 days.

(21) Appl. No.: 12/989,262

(22) PCT Filed: Mar. 23, 2009

(86) PCT No.: PCT/ES2009/000160
§ 371 (c)(1),
(2), (4) Date: Dec. 30, 2010

(87) PCT Pub. No.: WO2009/130343
PCT Pub. Date: Oct. 29, 2009

(65) Prior Publication Data
US 2011/0091287 A1    Apr. 21, 2011

(30) Foreign Application Priority Data
Apr. 24, 2008 (ES) .................. 200801178

(51) Int. Cl.
*E02D 27/52* (2006.01)
*F03D 11/04* (2006.01)
(52) U.S. Cl.
USPC ........................................ 405/207

(58) Field of Classification Search
USPC .............. 405/195.1, 203–205, 207, 210, 222, 405/223, 224; 52/300, 301, 455–458, 52/745.04, 745.15
See application file for complete search history.

(56) References Cited

U.S. PATENT DOCUMENTS 3,091,089 A * 5/1963 Gellerstad ............. 405/206
3,879,952 A * 4/1975 Mo ....................... 405/207
(Continued)

FOREIGN PATENT DOCUMENTS

EP    1777348 A1    4/2007
FR     533499 A     3/1922
(Continued)

*Primary Examiner* — Tara M. Pinnock
(74) *Attorney, Agent, or Firm* — Blank Rome LLP (57) ABSTRACT

The invention relates to a supporting element (8) for an offshore wind turbine (3), comprising a base body (1) formed by a circular or polygonal basement (4), a shaft (5) with vertical walls and a plurality of vertical cavities (6) extending over the entire height thereof and a slab (2) dispose on the shaft (5) of the base body (1), on which slab (2) a wind turbine (3) is positioned and secured. The base body (1) of the supporting element (8) is produced using sliding formwork, from the basement (4) up to the upper base thereof. In addition, the method includes the following steps: ballasting the supporting element (8) by partially filling the above-mentioned vertical cavities (6); seaward towing the supporting element (8) from the production site thereof to the offshore wind turbine installation site; anchoring the supporting element (8) by filling the vertical cavities (6) completely; until the supporting element (8) rests on a stone bed (19) on the sea bed; and mounting the wind turbine (3).

6 Claims, 6 Drawing Sheets

(56) References Cited

U.S. PATENT DOCUMENTS

| | | | |
|---|---|---|---|
| 3,889,476 A * | 6/1975 | Gerin | 405/210 |
| 4,193,714 A * | 3/1980 | Gjerde | 405/204 |
| 4,241,685 A * | 12/1980 | Mougin | 114/264 |
| 4,478,537 A * | 10/1984 | Birdy et al. | 405/217 |
| 4,576,519 A * | 3/1986 | Mast et al. | 405/207 |
| 5,044,830 A * | 9/1991 | Barbaras et al. | 405/210 |
| 5,049,004 A * | 9/1991 | Niimura | 405/204 |
| 6,532,700 B1 | 3/2003 | Maliszewski et al. | |
| 2007/0243063 A1 | 10/2007 | Schellstede | |
| 2008/0224022 A1 * | 9/2008 | Kreiner | 249/192 |

FOREIGN PATENT DOCUMENTS

| | | |
|---|---|---|
| FR | 2261925 A1 | 9/1975 |
| FR | 2887900 A1 | 1/2007 |
| GB | 1020555 A | 2/1966 |
| JP | 5771936 | 5/1982 |
| JP | 10-131200 | 5/1998 |
| JP | 2001-214419 | 8/2001 |
| JP | 2002-278858 | 9/2002 |
| WO | WO-0134977 A1 | 5/2001 |

* cited by examiner

SECTION AA

SUPPORTING ELEMENT FOR AN OFFSHORE WIND TURBINE, PRODUCTION METHOD THEREOF AND METHOD FOR INSTALLING SAME

This application is a U.S. national phase application under 35 U.S.C. §371 of International Patent Application No. PCT/ES2009/000160, filed Mar. 23, 2009, which claims the benefit of Spanish Patent Application No. P200801178, filed Apr. 24, 2008.

OBJECT OF THE INVENTION

The following invention, as stated in the title of the present specification, relates to a supporting element for an offshore wind turbine, production process thereof and method for installing same, whose supporting element is composed of a base body and a slab above it, the first objective thereof being that the supporting element rests on the sea bed and the slab stays at the sea and wave level.

A second object of the invention is that the base body forming the supporting element is manufactured by means of a simple sliding formwork method, with the added advantage of being able to be produced on a floating vessel.

A third object of the invention is that, by means of the partial filling of the cavities of the base body, the supporting element floats with sufficient stability for the towing thereof from the manufacturing site to the installation site in open sea.

Another object of the invention is that different components of the wind turbine can be transported on the supporting element during the towing thereof to the installation site.

FIELD OF APPLICATION

The present specification discloses a supporting element for an offshore wind turbine, production process thereof and method for installing same, the support whereof being applicable to be installed on a stone bed on the sea bed, emerging at sea and wave level.

BACKGROUND OF THE INVENTION

As is known, the installation of wind turbines at sea presents various technical and economical problems, highlighting as the most relevant the method of installing the unit and fastening the wind turbine to the sea bed.

Therefore, different models of these systems have been developed, considering the system disclosed in patent application US 2007/0243063, wherein a structure for a wind turbine in open sea and method thereof is disclosed, with the object of lifting and retracting wind turbine assemblies in open sea, wind turbine folding blades being amongst the featured structures.

Likewise, we can consider patent application WO 0134977A1, which shows a system of fastening to the sea bed through gravity, the system whereof containing a single cavity which is filled with water to fasten it to the sea bed. In this design, the wind turbine tower is exposed to the action of waves and currents.

Also, in patent application EP 1777348 A1, a conical-shaped gravity foundation with a single cavity in the interior thereof is disclosed, suitable for supporting an offshore wind turbine.

DESCRIPTION OF THE INVENTION

Herein is disclosed a supporting element for an offshore wind turbine, production process thereof and method for installing same, so that the supporting element comprises:

a base body composed of a circular or polygonal basement, with a shaft with vertical walls having similar cross section, with and a plurality of vertical cavities extending over the entire circular or polygonal sectioned height thereof, and;

a slab disposed on the shaft of the base body, whereon a wind turbine is supported and fastened.

The supporting element resting on a stone bed of the sea bed has the upper slab above sea and wave level, preventing them from falling on the wind turbine tower.

On the other hand, the slab which rests on the shaft of the base body and whereon the wind turbine is supported and fastened has a series of through orifices coinciding with the vertical cavities of the lower supporting body.

Furthermore, the support and fastening slab of the wind turbine can be of variable thickness, being of greater thickness in the support and fastening area of the wind turbine.

The geometry and distribution of the masses of the base body of the element is such that ballasted by means of the partial filling of the vertical cavities thereof, said supporting element floats with sufficient stability for the towing thereof to the installation site.

Likewise, the support and fastening slab of the wind turbine can feature an interface for connecting an erection crane for mounting and changing components of the unit.

Additionally, the slab can incorporate a first portion of the wind turbine tower.

The base body of the supporting element, substantially of reinforced concrete, is manufactured by means of sliding formwork, from the basement up to the upper base thereof.

The base body of the supporting element is manufactured on a floating vessel.

On the other hand, the assembly method of the supporting element comprises:

ballasting the supporting element by partially filling the vertical cavities of the base body so that it floats with sufficient stability;

seaward towing the supporting element from the production site thereof to the offshore wind turbine installation site;

anchoring the supporting element by filling the vertical cavities completely, until the element rests on a stone bed on the sea bed, the supporting element emerging from the sea and wave levels, and;

assembling the wind turbine.

The filling of the vertical cavities of the base body is performed via the through orifices of the slab, said orifices being covered after the complete filling of the cavities.

At least one of the vertical cavities of the base body, positioned below the wind turbine, is filled with concrete at least in the upper part thereof.

Components of the wind turbine are provisionally fastened to the upper slab of the base body of the supporting element for the transport thereof, permitting costs to be reduced.

Furthermore, the support and fastening slab of the wind turbine can be provided with an interface for connecting of an erection crane for mounting and changing components of the unit, with the advantage of not requiring large crane barges for the assembly thereof and maintenance operations.

In order to complement the description being carried out and with the purpose of helping towards a better understanding of the characteristics of the invention, a set of drawings is attached to the present specification, wherein the most characteristic details of the invention have been represented in an illustrative and non-limiting character:

DESCRIPTION OF A PREFERRED EMBODIMENT

In view of the aforementioned figures and according to the adopted numbering, we can observe how the supporting element 8 is composed of a base body 1 and a slab 2 for the supporting and fastening of the corresponding wind turbine 3.

The base body 1 is configured by a circular or polygonal basement 4 and a shaft 5, of similar section, forming a series of vertical cavities 6, extending over the entire height thereof, of circular or polygonal section, the bodies 1 being produced by a sliding formwork system on a floating dock 7.

Therefore, the supporting element 8 is formed by a base body 1 and an upper support and fastening slab 2 of, at least, a wind turbine 3, whose superstructure slab 2 features a series of orifices 9 coinciding with the vertical cavities 6 of the base body 1.

The support and fastening slab 2 of the wind turbine 3 can be of variable thickness and features a greater thickness in the support and fastening area 13 of the wind turbine 3.

Once the base body 1 has been produced and the superstructure slab 2 has been incorporated, with the partial filling of the vertical cavities 6 of the supporting element 8, this floats with sufficient stability for the towing thereof to the installation site.

Furthermore, as it has several independent cavities 6 for the filling thereof, it permits solid flotation stability, preventing a possible overturn.

Likewise, in a practical embodiment of the invention the support and fastening slab 2 of the wind turbine 3 can incorporate, at least, a part 14 of the wind turbine 3 tower 10.

On the other hand, given that the support and fastening slab 2 of the wind turbine 3 defines a large surface, it permits the transport of different components of the wind turbine 3 to the offshore installation site, such as the nacelle 11, portions of the tower 15, hub, etc., which represents an economic saving in the transportation operation.

Likewise, an interface 17 can be available in the slab 2 for the connection of a crane 16 wherethrough the assembling and changing of components of the unit will be carried out, which represents a large economic saving in the assembly and maintenance operations, given the high cost and low availability of boats equipped with cranes.

Regarding the production process of the base bodies 1, they will preferably be manufactured by means of a sliding formwork which is filled with concrete and moves vertically, resulting in an economical and simple system.

Figure 1:
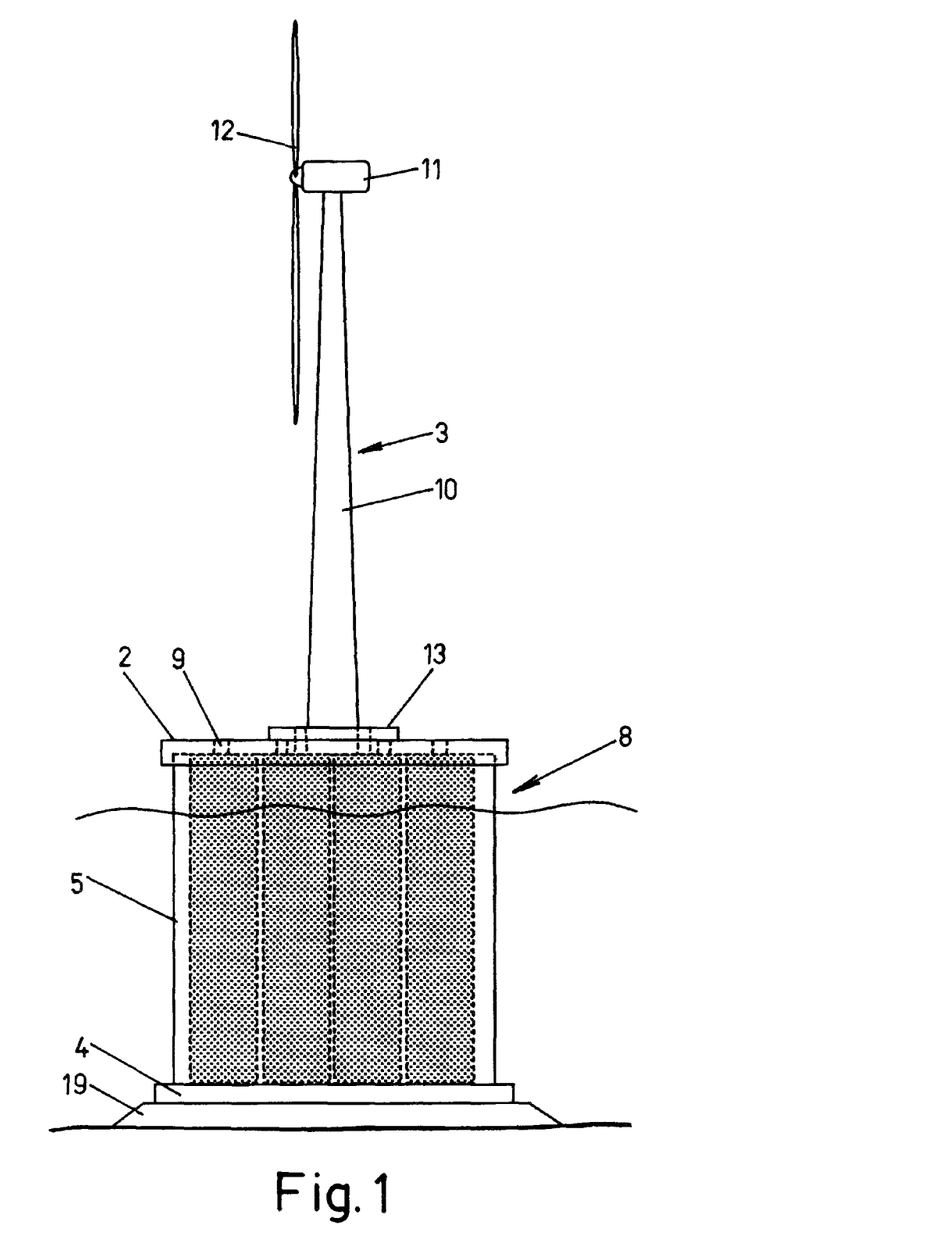
FIG. 1 shows an elevational view of a wind turbine assembled on a supporting element resting on a bank basement of the sea bed, whose supporting element is composed of a base body and an upper slab.
Figure 2:
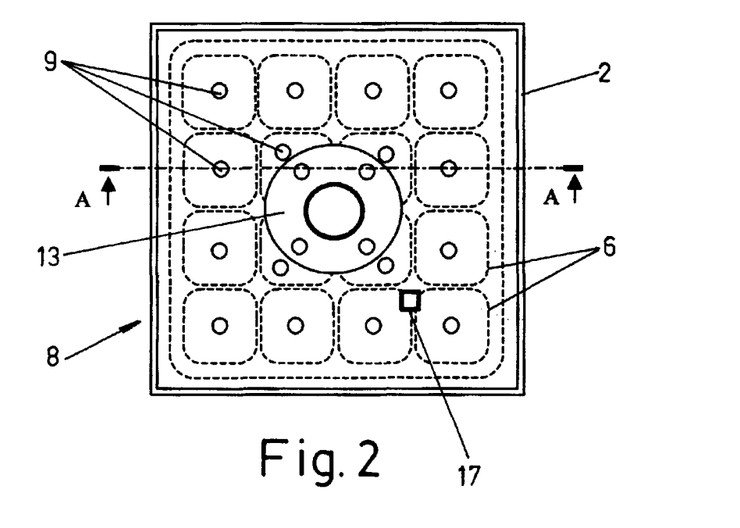
FIG. 2 shows a plan view of the supporting element of a wind turbine, being able to observe the through orifices of the upper slab which coincide with vertical cavities of the base body of the supporting element.
Figure 3:
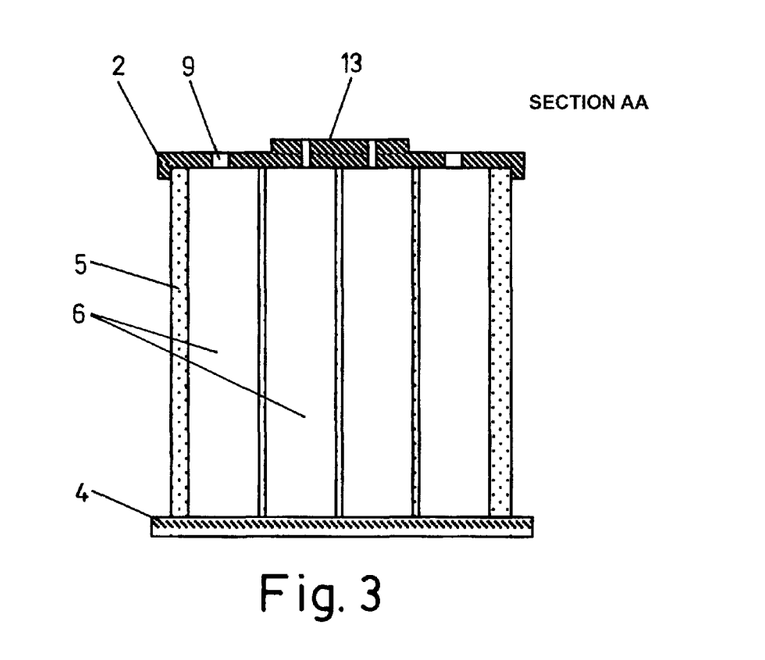
FIG. 3 shows an A-A sectional view of the previous figure, being able to observe the upper slab incorporated on the base body composed of a basement and a shaft with vertical cavities extending over the entire height thereof.
Figure 4:
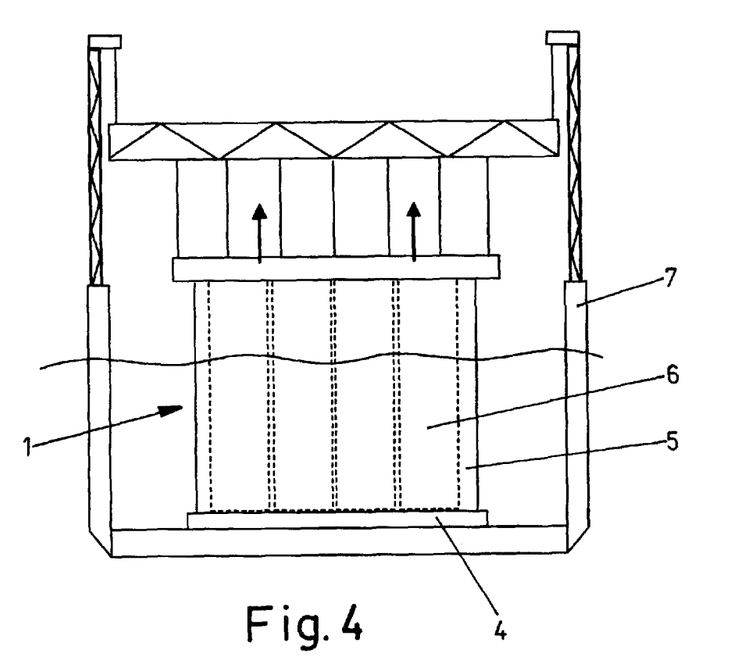
FIG. 4 shows a schematic view of the production system of the base body of the supporting element on a floating dock by a sliding formwork system.
Figure 5:
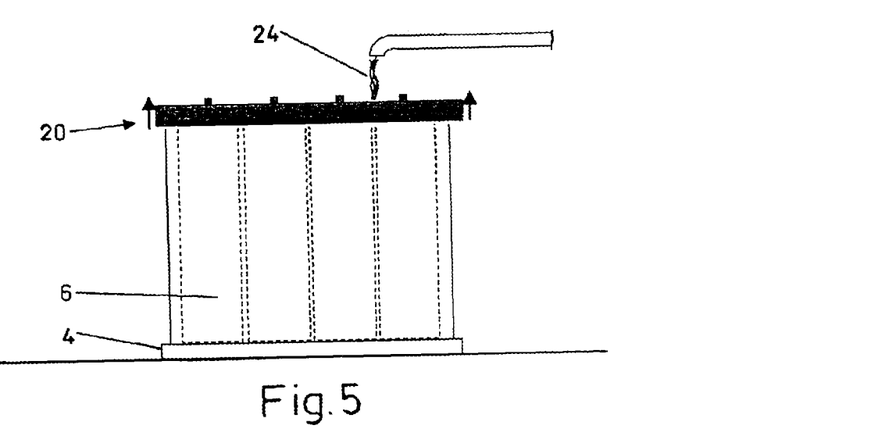
FIG. 5 shows an elevational view of the production process of the base body, being able to observe how the sliding formwork, of small dimensions, will be raised as the concrete hardens.
Figure 6:
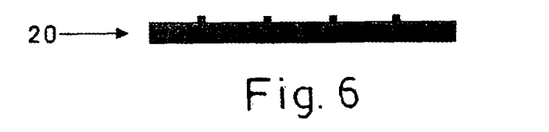
FIG. 6 shows an elevational view of the formwork body.
Figure 7:
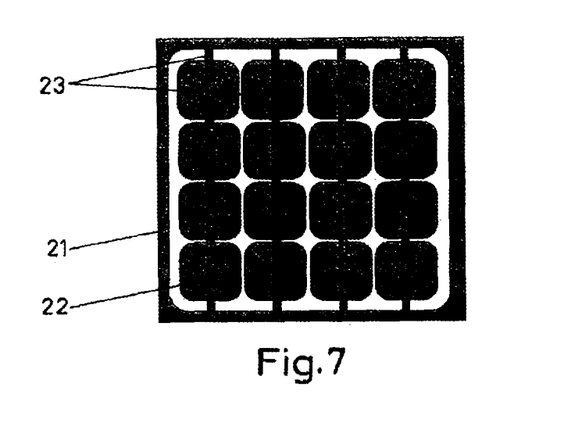
FIG. 7 shows a plan view of the production process of the base body, being able to observe how the sliding formwork is made up of an outer wall, a series of cores and an upper anchoring structure.
Figure 8:
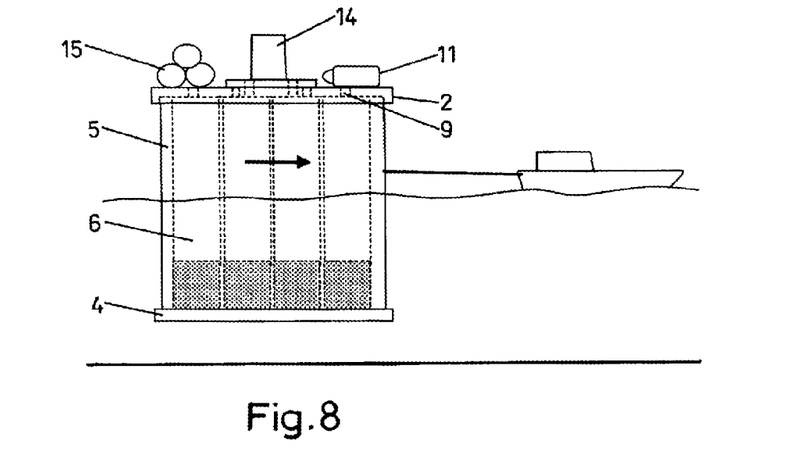
FIG. 8 shows a view of the towing of the supporting element of the wind turbine, being able to observe how the upper slab serves as support for the transportation of different components of the wind turbine.
Figure 9:
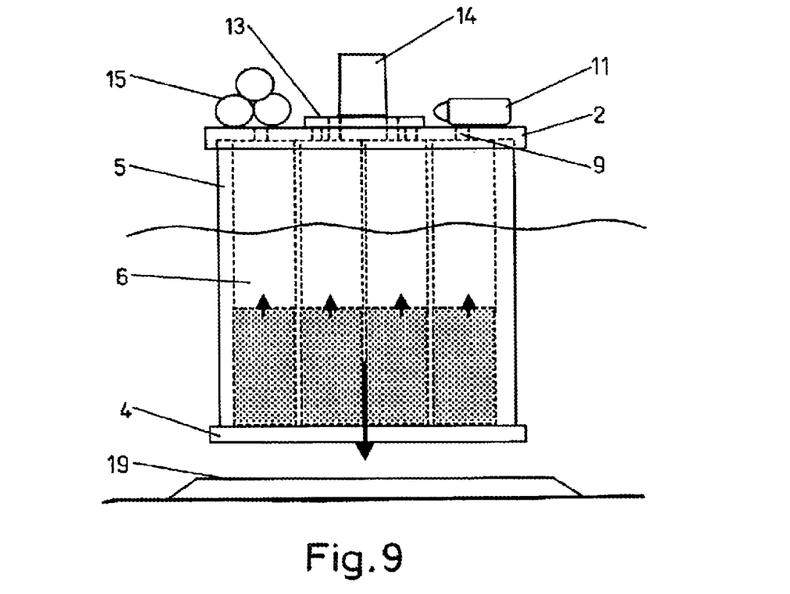
FIG. 9 shows a view of the manner of anchoring, by means of filling the vertical cavities of the base body which forms the supporting element of the wind turbine by situating it on a breakwater bank of the sea bed.
Figure 10:
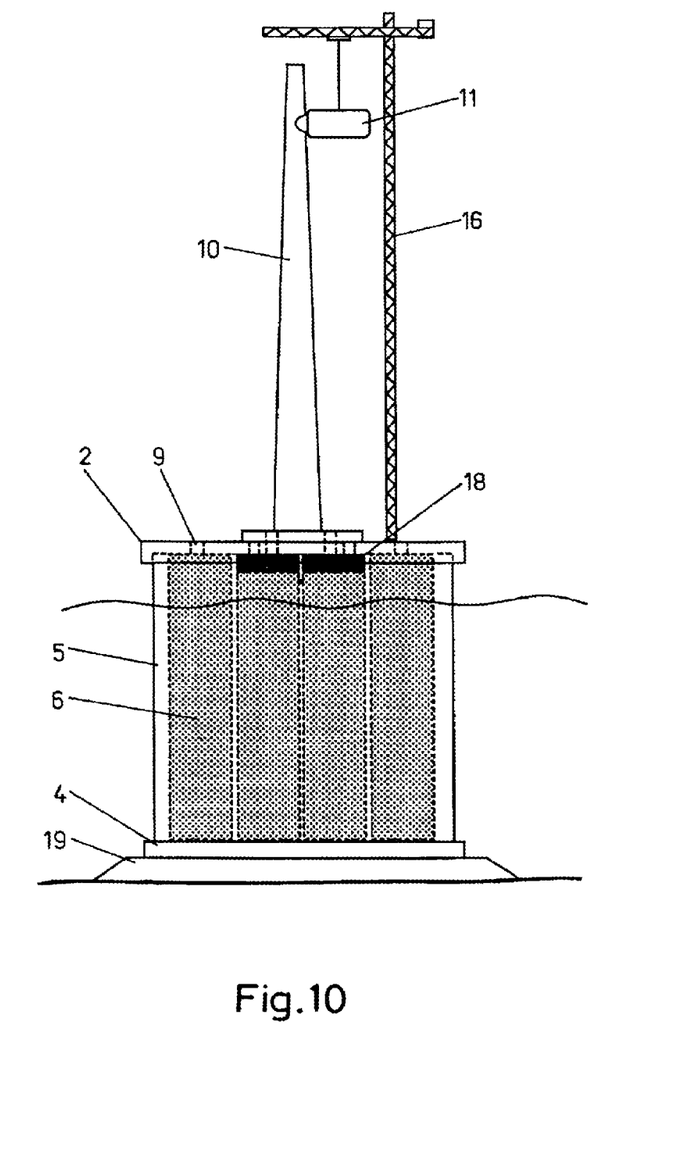
FIG. 10 shows a view of the air turbine tower and a crane assembled on the upper slab of the supporting element for assembling the wind turbine, being able to observe how the cavities of the base body of the supporting element have been filled for the installation thereof on the breakwater bank on the sea bed.

Thus, in light of FIGS. 4, 5 and 6, we can observe how the sliding formwork is formed by a body 20 which features a short height and is defined by an outer wall 21 and a series of cores 22 supported by a structure 23, so that the cores 22 will lead to the interior cavities 6 of the base body 1, the production process being able to be carried out on a floating vessel 7.

In this manner, the concrete 24 is poured in a continuous process, the formwork body 20 being progressively hoisted as the concrete hardens. In this way, by means of a single formwork of small dimensions, a shaft 5 as high as necessary can be made, depending on the depth of the sea bed at the site where the wind turbine must be supported.

On the other hand, the wind turbine 3 is of the type of wind turbines which is composed of a tower 10 which supports the nacelle 11 and a rotor made of several blades 12.

Once the supporting element 8 has been transported to the installation site, the complete filling of the vertical cavities 6 will be performed, causing the anchoring thereof until it is perfectly settled on a stone bed 19 of the sea bed, so that the support and fastening slab 2 of the tower 10 of the wind turbine 3 is above sea and wave level.

On the other hand, an assembly method of the supporting element 8 which bears the wind turbine 3 is also provided, so that said method comprises:

ballasting the supporting element 8 by partially filling the vertical cavities 6 through the through orifices 9 of the upper slab 2 of the supporting element 8;

seaward towing the supporting element 8 from the production site thereof to the offshore wind turbine 3 installation site;

anchoring the supporting element 8 by filling the vertical cavities 6 completely, until the element rests on a stone bed 19 on the sea bed, the supporting element 8 emerging from the sea and wave levels, and;

assembling the wind turbine 3.

Thus, incorporated on the base body 1 is a support and fastening slab 2 of, at least, a wind turbine 3, whose slab 2 features a series of through orifices 9 with respect to the vertical cavities 6, by means of whose orifices 9 permits the filling of said vertical cavities 6 of the base body 1 which forms the supporting element 8.

In this manner, once the base body 1 has been produced and the superstructure slab 2 has been incorporated in its upper part, by means of the partial filling of the vertical cavities 6 of the base body 1 forming the supporting element 8, the stable flotation thereof during the towing from the production site to the installation site is guaranteed.

The flotation stability of the supporting element 8 is aided by the disposal of a plurality of ballast cavities 6, preventing possible overturns.

In a practical embodiment, at least one of the vertical cavities 6 positioned below the wind turbine 3 is filled with concrete 18 at least in its upper part. In a preferred embodiment, the partial filling of the upper part of the vertical cavities 6 positioned below the wind turbine 3 with concrete 18 is produced in order to reinforce the superstructure slab 2 below the wind turbine tower 10.

Likewise, components of the wind turbine 3, such as portions of the tower 15, the nacelle 11, the hub, etc., are provisionally disposed on the upper slab 2 of the supporting element 8 for the transport thereof.

Additionally, the upper slab 2 of the supporting element 8 has an interface 17 for the connection of a crane 16 for assembling the wind turbine 3, as well as for use in maintenance operations.

This embodiment, as indicated, provides a huge advantage given that it represents a large economic saving as it does not require large boats for the transportation of all of the components thereof, as well as low-availability and high-cost boats equipped with cranes.

The invention claimed is:

1. A method of assembling a supporting element for an offshore wind turbine, the supporting element comprising a base and a slab disposed on a top surface of the base, the slab configured to support and anchor the wind turbine and the slab comprises a plurality of through orifices, each of the plurality of through orifices corresponding to a respective one of the plurality of vertical cavities of the shaft, the base comprising a basement and a shaft comprising a plurality of vertical walls and a plurality of vertical cavities extending through the shaft, the method comprising:

ballasting the supporting element by partially filling one or more of the plurality of vertical cavities of the shaft;

seaward towing the supporting element from a production site thereof to an offshore wind turbine installation site comprising a stone bed on a sea bed; and anchoring the supporting element by filling one or more of the plurality of vertical cavities until the supporting element rests on the stone bed on the sea bed by filling the one or more of the plurality of vertical cavities of the shaft via one or more of the plurality of through orifices of the slab; and covering the plurality of through orifices after the filling of the one or more of the plurality of vertical cavities is complete.

2. The method according to claim 1, wherein an upper part of at least one of the plurality of vertical cavities of the shaft positioned below the wind turbine is filled with concrete.

3. The method according to claim 1, wherein the wind turbine comprises one or more components and the method further comprises provisionally fastening the one or more components of the wind turbine to the slab disposed on the base of the supporting element for transport of said one or more components.

4. The method according to claim 1, wherein the slab comprises an interface for connecting an erection crane to the slab, the erection crane for mounting and changing components of the wind turbine, the method further comprising connecting the erection crane to the interface.

5. The method according to claim 1, wherein the step of anchoring the supporting element comprises filling one or more of the plurality of vertical cavities until the supporting element rests on the stone bed on the sea bed in such a way that a top surface of the supporting element is above sea and wave levels.

6. The method according to claim 1, further comprising assembling the wind turbine.

* * * * *